United States Patent
Vico et al.

(10) Patent No.: US 9,150,155 B2
(45) Date of Patent: Oct. 6, 2015

(54) VEHICULAR CAMERA AND METHOD FOR PERIODIC CALIBRATION OF VEHICULAR CAMERA

(75) Inventors: Marko Vico, Etobicoke (CA); Sharon Zibman, Thornhill (CA); Aleksandar Stefanovic, Mississauga (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 544 days.

(21) Appl. No.: 13/521,872

(22) PCT Filed: Jan. 13, 2011

(86) PCT No.: PCT/CA2011/000048
§ 371 (c)(1),
(2), (4) Date: Aug. 20, 2012

(87) PCT Pub. No.: WO2011/085489
PCT Pub. Date: Jul. 21, 2011

(65) Prior Publication Data
US 2012/0320209 A1   Dec. 20, 2012

Related U.S. Application Data

(60) Provisional application No. 61/294,619, filed on Jan. 13, 2010.

(51) Int. Cl.
*H04N 7/18* (2006.01)
*B60R 1/00* (2006.01)
(Continued)

(52) U.S. Cl.
CPC . *B60R 1/00* (2013.01); *B60R 11/04* (2013.01); *G06T 7/0018* (2013.01); *B60R 2300/402* (2013.01); *B60R 2300/806* (2013.01); *G06T 2207/30252* (2013.01)

(58) Field of Classification Search
CPC ......... H04N 7/181; H04N 7/183; H04N 7/18; H04N 7/188; B60R 1/00; B60R 2300/105; B60R 2300/802; B60R 11/04; B60R 2300/806; G08G 1/04; G08G 1/0175; G08G 1/054; G06T 2207/30252
USPC ............... 348/148, 149, 143; 340/932.2, 937, 340/995.28, 435; 701/300, 301
IPC ....................................................... H04N 7/18
See application file for complete search history.

(56) References Cited

U.S. PATENT DOCUMENTS

| | | |
|---|---|---|
| 5,355,118 A | 10/1994 | Fukuhara |
| 5,365,603 A | 11/1994 | Karmann |

(Continued)

FOREIGN PATENT DOCUMENTS

| | | |
|---|---|---|
| DE | 19962997 | 6/2001 |
| DE | 102006044615 | 3/2008 |

(Continued)

OTHER PUBLICATIONS

European Search Report dated Oct. 2, 2013 from corresponding EP Application No. EP11732612.4.
(Continued)

*Primary Examiner* — Sherrie Hsia
(74) *Attorney, Agent, or Firm* — Gardner, Linn, Burkhart & Flory, LLP

(57) ABSTRACT

In a first aspect, the invention is directed to a vehicular camera and a method for calibrating the camera after it has been installed in a vehicle. In particular, the invention is directed to calibrating a vehicular camera after the camera has been installed in a vehicle, wherein the camera is of a type that applies an overlay to an image and outputs the image with the overlay to an in-vehicle display.

16 Claims, 13 Drawing Sheets

(51) Int. Cl.
*B60R 11/04* (2006.01)
*G06T 7/00* (2006.01)

(56) References Cited

U.S. PATENT DOCUMENTS

| | | |
|---|---|---|
| 5,369,590 A | 11/1994 | Karasudani |
| 5,424,952 A | 6/1995 | Asayama |
| 5,426,294 A | 6/1995 | Kobayashi et al. |
| 5,448,484 A | 9/1995 | Bullock et al. |
| 5,487,116 A | 1/1996 | Nakano et al. |
| 5,500,766 A | 3/1996 | Stonecypher |
| 5,521,633 A | 5/1996 | Nakajima et al. |
| 5,521,843 A | 5/1996 | Hashima et al. |
| 5,523,811 A | 6/1996 | Wada et al. |
| 5,530,771 A | 6/1996 | Maekawa |
| 5,537,003 A | 7/1996 | Bechtel et al. |
| 5,541,590 A | 7/1996 | Nishio |
| 5,550,677 A | 8/1996 | Schofield et al. |
| 5,555,555 A | 9/1996 | Sato et al. |
| 5,568,190 A | 10/1996 | Noguchi et al. |
| 5,581,464 A | 12/1996 | Woll et al. |
| 5,596,365 A | 1/1997 | Erickson et al. |
| 5,617,085 A | 4/1997 | Tsutsumi et al. |
| 5,627,586 A | 5/1997 | Yamasaki |
| 5,638,116 A | 6/1997 | Shimoura et al. |
| 5,642,093 A | 6/1997 | Kinoshita et al. |
| 5,642,299 A | 6/1997 | Hardin et al. |
| 5,668,663 A | 9/1997 | Varaprasad et al. |
| 5,670,935 A | 9/1997 | Schofield et al. |
| 5,675,489 A | 10/1997 | Pomerleau |
| 5,715,093 A | 2/1998 | Schierbeek et al. |
| 5,724,187 A | 3/1998 | Varaprasad et al. |
| 5,745,310 A | 4/1998 | Mathieu |
| 5,760,962 A | 6/1998 | Schofield et al. |
| 5,786,772 A | 7/1998 | Schofield et al. |
| 5,790,403 A | 8/1998 | Nakayama |
| 5,796,094 A | 8/1998 | Schofield et al. |
| 5,798,575 A | 8/1998 | O'Farrell et al. |
| 5,837,994 A | 11/1998 | Stam et al. |
| 5,845,000 A | 12/1998 | Breed et al. |
| 5,850,254 A | 12/1998 | Takano et al. |
| 5,877,897 A | 3/1999 | Schofield et al. |
| 5,884,212 A | 3/1999 | Lion |
| 5,890,083 A | 3/1999 | Franke et al. |
| 5,892,855 A | 4/1999 | Kakinami et al. |
| 5,929,784 A | 7/1999 | Kawaziri et al. |
| 5,929,786 A | 7/1999 | Schofield et al. |
| 6,005,492 A | 12/1999 | Tamura et al. |
| 6,009,337 A | 12/1999 | Vaisanen et al. |
| 6,044,321 A | 3/2000 | Nakamura et al. |
| 6,049,619 A | 4/2000 | Anandan et al. |
| 6,097,023 A | 8/2000 | Schofield et al. |
| 6,104,552 A | 8/2000 | Thau et al. |
| 6,163,083 A | 12/2000 | Kramer et al. |
| 6,169,940 B1 | 1/2001 | Jitsukata et al. |
| 6,173,222 B1 | 1/2001 | Seo et al. |
| 6,201,236 B1 | 3/2001 | Juds |
| 6,201,642 B1 | 3/2001 | Bos |
| 6,218,960 B1 | 4/2001 | Ishikawa et al. |
| 6,226,389 B1 | 5/2001 | Lemelson et al. |
| 6,226,592 B1 | 5/2001 | Luckscheiter et al. |
| 6,243,003 B1 | 6/2001 | DeLine et al. |
| 6,246,961 B1 | 6/2001 | Sasaki et al. |
| 6,249,214 B1 | 6/2001 | Kashiwazaki |
| 6,250,148 B1 | 6/2001 | Lynam |
| 6,269,308 B1 | 7/2001 | Kodaka et al. |
| 6,278,377 B1 | 8/2001 | DeLine et al. |
| 6,282,483 B1 | 8/2001 | Yano et al. |
| 6,285,393 B1 | 9/2001 | Shimoura et al. |
| 6,292,111 B1 | 9/2001 | Ishikawa et al. |
| 6,292,752 B1 | 9/2001 | Franke et al. |
| 6,313,454 B1 | 11/2001 | Bos et al. |
| 6,317,057 B1 | 11/2001 | Lee |
| 6,320,176 B1 | 11/2001 | Schofield et al. |
| 6,330,511 B2 | 12/2001 | Ogura et al. |
| 6,341,523 B2 | 1/2002 | Lynam |
| 6,353,392 B1 | 3/2002 | Schofield et al. |
| 6,396,397 B1 | 5/2002 | Bos et al. |
| 6,411,204 B1 | 6/2002 | Bloomfield et al. |
| 6,420,975 B1 | 7/2002 | DeLine et al. |
| 6,433,676 B2 | 8/2002 | DeLine et al. |
| 6,485,155 B1 | 11/2002 | Duroux et al. |
| 6,498,620 B2 | 12/2002 | Schofield et al. |
| 6,580,996 B1 | 6/2003 | Friedrich |
| 6,590,719 B2 | 7/2003 | Bos |
| 6,594,583 B2 | 7/2003 | Ogura et al. |
| 6,671,607 B2 | 12/2003 | Ishizu et al. |
| 6,690,268 B2 | 2/2004 | Schofield et al. |
| 6,691,008 B2 | 2/2004 | Kondo et al. |
| 6,708,100 B2 | 3/2004 | Russell et al. |
| 6,717,610 B1 | 4/2004 | Bos et al. |
| 6,748,312 B2 | 6/2004 | Russell et al. |
| 6,757,109 B2 | 6/2004 | Bos |
| 6,760,471 B1 | 7/2004 | Raymond |
| 6,768,509 B1 | 7/2004 | Bradski et al. |
| 6,813,371 B2 | 11/2004 | Kakinami |
| 6,823,241 B2 | 11/2004 | Shirato et al. |
| 6,824,281 B2 | 11/2004 | Schofield et al. |
| 6,882,287 B2 | 4/2005 | Schofield |
| 6,928,180 B2 | 8/2005 | Stam et al. |
| 6,941,216 B2 | 9/2005 | Isogai et al. |
| 6,946,978 B2 | 9/2005 | Schofield |
| 6,968,266 B2 | 11/2005 | Ahmed-Zaid et al. |
| 7,005,974 B2 | 2/2006 | McMahon et al. |
| 7,038,577 B2 | 5/2006 | Pawlicki et al. |
| 7,049,945 B2 | 5/2006 | Breed et al. |
| 7,151,844 B2 | 12/2006 | Stevenson et al. |
| 7,188,963 B2 | 3/2007 | Schofield et al. |
| 7,295,682 B2 | 11/2007 | Otsuka et al. |
| 7,370,983 B2 | 5/2008 | DeWind et al. |
| 7,388,475 B2 | 6/2008 | Litkouhi |
| 7,391,014 B2 | 6/2008 | Saccagno |
| 7,420,592 B2 | 9/2008 | Freeman |
| 7,526,103 B2 | 4/2009 | Schofield et al. |
| 7,565,006 B2 | 7/2009 | Stam et al. |
| 7,720,580 B2 | 5/2010 | Higgins-Luthman |
| 7,764,808 B2 | 7/2010 | Zhu et al. |
| 7,949,486 B2 | 5/2011 | Denny et al. |
| 8,248,471 B2 | 8/2012 | Inui et al. |
| 8,300,886 B2 | 10/2012 | Hoffmann |
| 8,421,865 B2 | 4/2013 | Euler et al. |
| 8,451,107 B2 * | 5/2013 | Lu et al. ............... 348/143 |
| 2002/0003571 A1 | 1/2002 | Schofield et al. |
| 2002/0159270 A1 | 10/2002 | Lynam et al. |
| 2002/0188392 A1 | 12/2002 | Breed et al. |
| 2003/0025597 A1 | 2/2003 | Schofield |
| 2003/0052773 A1 | 3/2003 | Sjonell |
| 2003/0156015 A1 | 8/2003 | Winner et al. |
| 2003/0169522 A1 | 9/2003 | Schofield et al. |
| 2003/0236622 A1 | 12/2003 | Schofield |
| 2004/0149504 A1 | 8/2004 | Swoboda et al. |
| 2005/0232469 A1 | 10/2005 | Schofield et al. |
| 2006/0050018 A1 | 3/2006 | Hutzel et al. |
| 2006/0125919 A1 | 6/2006 | Camilleri et al. |
| 2006/0164230 A1 | 7/2006 | DeWind et al. |
| 2006/0171704 A1 * | 8/2006 | Bingle et al. ............ 348/118 |
| 2008/0144924 A1 | 6/2008 | Hoffmann |
| 2009/0290032 A1 | 11/2009 | Zhang et al. |
| 2010/0002071 A1 | 1/2010 | Ahiska |
| 2011/0216201 A1 | 9/2011 | McAndrew et al. |
| 2013/0169812 A1 | 7/2013 | Lu et al. |
| 2013/0286193 A1 | 10/2013 | Pflug |
| 2014/0022378 A1 | 1/2014 | Higgins-Luthman |
| 2014/0043473 A1 | 2/2014 | Rathi et al. |
| 2014/0063254 A1 | 3/2014 | Shi et al. |
| 2014/0098229 A1 | 4/2014 | Lu et al. |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |

(56) References Cited

U.S. PATENT DOCUMENTS

| | | |
|---|---|---|
| 2014/0347486 A1 | 11/2014 | Okouneva |
| 2014/0350834 A1 | 11/2014 | Turk |

FOREIGN PATENT DOCUMENTS

| | | |
|---|---|---|
| DE | 102007043905 | 5/2008 |
| EP | 0132151 A1 | 1/1985 |
| EP | 0354261 A1 | 2/1990 |
| EP | 0591743 A1 | 4/1994 |
| EP | 0755524 B1 | 10/1995 |
| EP | 1710749 | 10/2006 |
| EP | 2377094 | 10/2011 |
| JP | 01-281600 | 11/1989 |
| JP | 03-097080 | 4/1991 |
| JP | 03-203000 | 9/1991 |
| JP | 05-062099 | 3/1993 |
| JP | 9150670 | 6/1997 |
| JP | 2002074339 | 3/2002 |
| JP | 2003-087781 | 3/2003 |
| JP | 2003-329439 | 11/2003 |
| JP | 2005-039599 | 2/2005 |
| JP | 2005-077107 | 3/2005 |
| JP | 2006-135621 | 5/2006 |
| JP | 2007-256030 | 10/2007 |
| JP | 2009212734 | 9/2009 |
| JP | 2010-173481 | 8/2010 |
| WO | WO 2007/049266 | 5/2007 |
| WO | WO 2010/038224 | 4/2010 |

OTHER PUBLICATIONS

Van Leuven et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

Van Leeuwen et al., "Motion Estimation with a Mobile Camera for Traffic Applications", IEEE, US, Oct. 3, 2000, pp. 58-63.

Van Leeuwen et al., "Motion Interpretation for In-Car Vision Systems", IEEE, US, vol. 1, Sep. 30, 2002, pp. 135-140.

Van Leeuwen et al., "Motion Estimation in Image Sequences for Traffic Applications", vol. 1, May 1, 2000, pp. 354-359, XP002529773.

Pratt, "Digital Image Processing, Passage—Ed.3", John Wiley & Sons, US, Jan. 1, 2001, pp. 657-659, XP002529771.

Supplemental European Search Report completed May 29, 2009, from corresponding European Application No. EP 03 72 1946.

Hicks et al., "Panoramic Electronic Rear Vision for Automotive Applications", Society of Automotive Engineers (SAE). Mar. 1-4, 1999, 1999-01-0655.

J. Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Vlacic et al., (Eds), "Intelligent Vehicle Technologies, Theory and Applications", Society of Automotive Engineers Inc., edited by SAE International, 2001.

International Search Report and Written Opinion dated Apr. 6, 2011 from corresponding PCT application No. PCT/CA2011/00048.

\* cited by examiner

VEHICULAR CAMERA AND METHOD FOR PERIODIC CALIBRATION OF VEHICULAR CAMERA

CROSS REFERENCE TO RELATED APPLICATIONS

The present application is a 371 of PCT Application No. PCT/CA2011/000048, filed Jan. 13, 2011, which claims the filing benefit of U.S. provisional application Ser. No. 61/294,619, filed Jan. 13, 2010, which are hereby incorporated by reference in their entireties.

FIELD OF THE INVENTION

The present invention relates to cameras for use in vehicles, and more particularly to a camera for use in a vehicle wherein an overlay is applied to the image on board the camera.

BACKGROUND OF THE INVENTION

A typical camera for mounting on a vehicle has a lens member, an imager, a circuit board and housing members that connect together. Some cameras have the capability to apply an overlay onto the image received by the imager, and to send the image with the overlay in it directly to an in-vehicle display for viewing by the vehicle driver. Over time, however, it is possible that during use of the vehicle, the camera system can become misaligned. This can occur gradually from a variety of factors. It can also occur suddenly, such as, during an accident. Whether gradually or because of an accident, the misalignment can occur without being detected upon visual inspection of the camera.

SUMMARY OF THE INVENTION

In a first aspect, the invention is directed to a vehicular camera and a method for calibrating the camera after it has been installed in a vehicle. In particular, the invention is directed to calibrating a vehicular camera after the camera has been installed in a vehicle, wherein the camera is of a type that applies an overlay to an image and outputs the image with the overlay to an in-vehicle display.

In a particular embodiment, the camera includes a lens, an imager and a camera microcontroller. The camera is positioned to receive images from behind a vehicle including a portion of the bumper of the vehicle. The imager includes an image sensor and an imager microcontroller. The image sensor is positioned to receive light corresponding to images from the lens. The camera microcontroller is configured to apply an overlay to the images. The camera microcontroller is configured to receive data from the imager microcontroller relating to bars of pixels on the image sensor, wherein the microcontroller is further configured to detect a reference point in the images using the data and is configured to determine an offset amount with which to shift the overlay on the images.

In a second aspect, the invention is directed to a method of calibrating a vehicular camera installed in a vehicle wherein the camera has an imager and a camera microcontroller, comprising:

a) determining whether the contrast in images received by the imager is beyond a selected threshold value;

b) searching for a reference point in the images depending on the result of step a) using the camera microcontroller; and c) adjusting the position of an overlay applied by the microcontroller to the images depending on the result of step b).

BRIEF DESCRIPTION OF THE DRAWINGS

The present invention will now be described by way of example only with reference to the attached drawings, in which:

FIG. 7b is a chart showing the gradients associated with the brightness levels of the vertically stacked bars shown in FIG. 7a;

FIG. 9b is a chart showing the gradients associated with the brightness levels of the vertically stacked bars shown in FIG. 9a;

FIG. 10b is a chart showing the gradients associated with the brightness levels of the vertically stacked bars shown in FIG. 10a;

FIG. 11b is a chart showing the gradients associated with the brightness levels of the vertically stacked bars shown in FIG. 11a;

FIG. 12b is a chart showing the gradients associated with the brightness levels of the vertically stacked bars shown in FIG. 12a;

FIG. 13b is a chart showing the pixel positions of the pixels having the highest associated gradients associated with the brightness levels search windows shown in FIG. 13a;

DETAILED DESCRIPTION OF THE INVENTION

Figure 1:
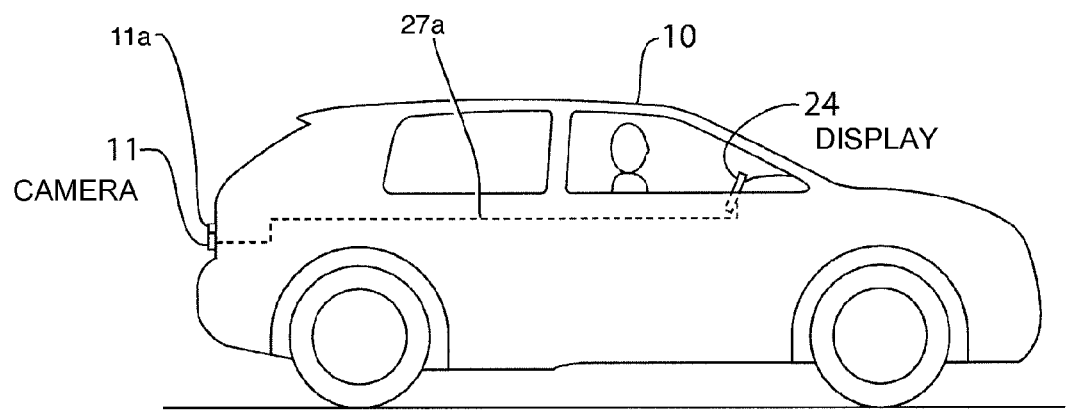
FIG. 1 is a side view of a vehicle with a camera in accordance with an embodiment of the present invention.

Reference is made to FIG. 1, which shows a vehicle 10 that includes a camera 11 sends images to an in-vehicle display 24. The camera 11 is configured to be calibrated periodically after it has been installed on the vehicle 10 in accordance with an embodiment of the present invention.

Figure 2:
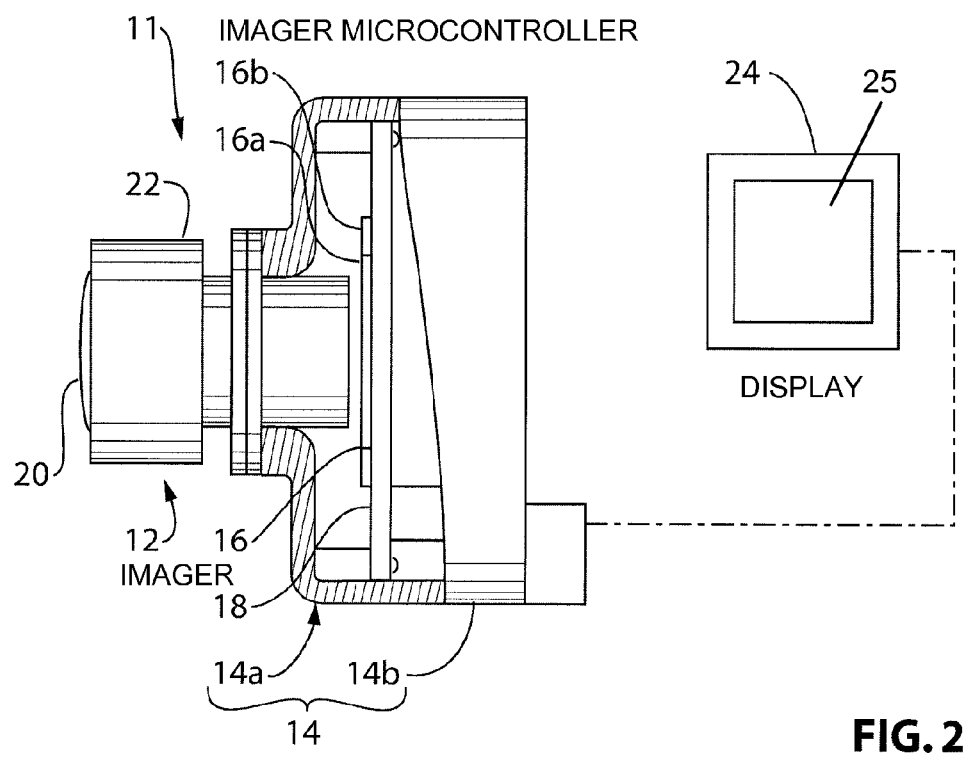
FIG. 2 is a magnified view of the camera shown in FIG. 1.

Reference is made to FIG. 2, which shows the camera 11 in greater detail. The camera 11 includes a lens assembly 12, a housing 14, which may include a lens holder 14a and a rear housing member 14b, an imager 16 and a camera microcontroller 18.

The lens assembly 12 is an assembly that includes a lens 20 and a lens barrel 22. The lens 20 may be held in the lens barrel 22 in any suitable way. The lens barrel 22 may be held in the lens holder 14a in any suitable way.

The imager 16 may be any suitable type of imager 16 such as the imager model no. MT9V126 provided by Aptina Imaging, San Jose, Calif. and includes an image sensor 16a, such as a CMOS sensor or a CCD sensor, and an imager microcontroller 16b that performs several functions. For example, the imager microcontroller 16b applies a distortion correction algorithm to the images 25 received by the image sensor 16a. Additionally, the imager microcontroller 16b applies graphical overlays to the images 25. Once the images 25 have been processed by the imager microcontroller 16b they are sent to the in-vehicle display 24 via an electrical conduit shown at 27a, which may be, for example a coaxial cable.

The microcontroller 18 may be any suitable type of microcontroller, such as the microcontroller model no. PIC24HJ128GP502 provided by Microchip Technology, Chandler, Ariz. The microcontroller 18 includes flash memory shown at 23 (FIG. 5) in which is stored the program for carrying out the periodic calibration of the camera 11.

Figure 3:
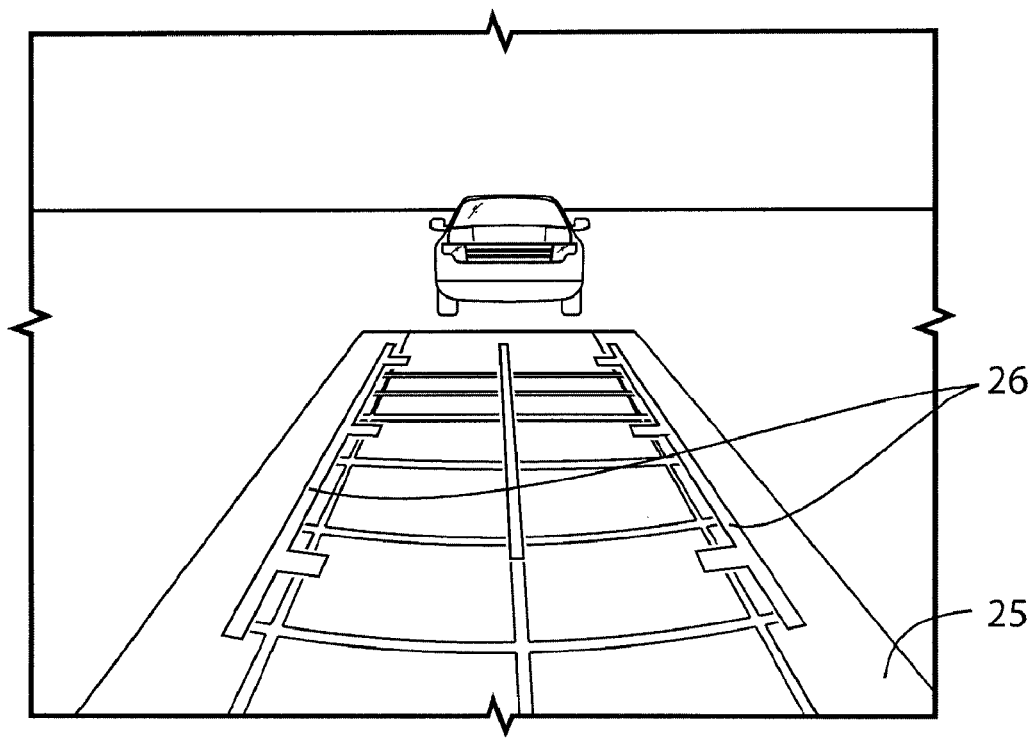
FIG. 3 is an exemplary image received by the camera shown in FIG. 1, with a static overlay on the image.
Figure 4:
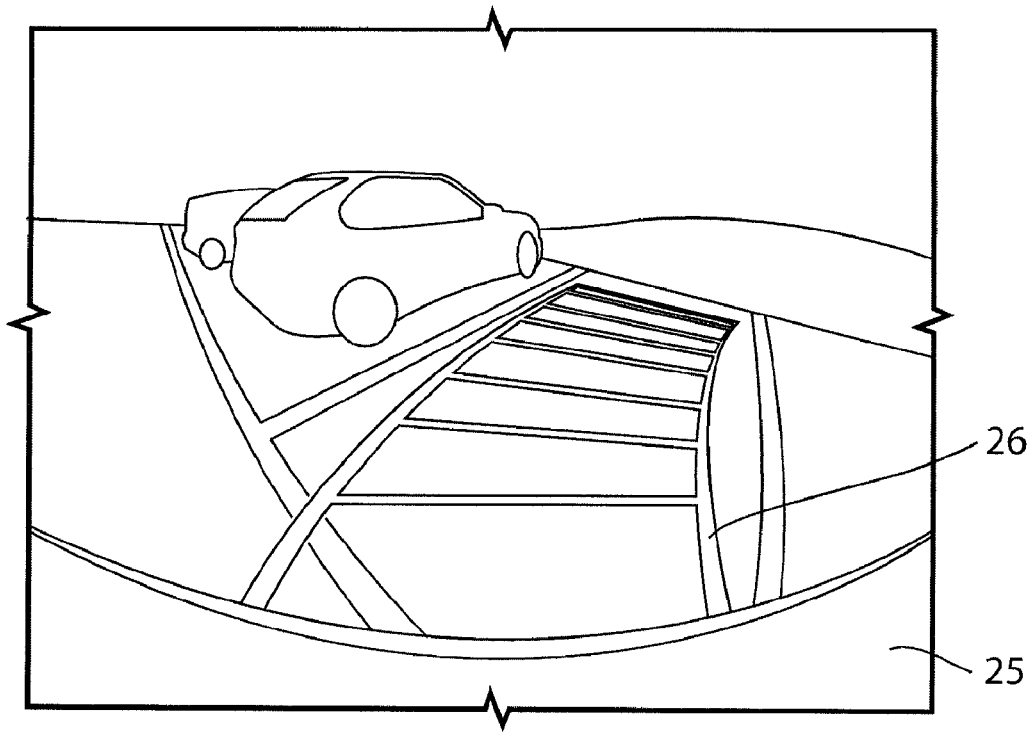
FIG. 4 is an exemplary image received by the camera shown in FIG. 1, with a dynamic overlay on the image.

External flash memory shown at 29 is used to store a plurality of overlays that can be applied to the images 25. Example overlays are shown in FIGS. 3 and 4 at 26. The overlay 26 shown in FIG. 3 provides information regarding the width of the vehicle 10 and rough distance information behind the vehicle. The overlay 26 shows the projected path of the vehicle 10 based on the current steering wheel angle of the vehicle 10.

The microcontroller 18 communicates with the imager microcontroller 16b via a bus, such as an I2C bus, shown at 27b, to provide information, such as the location in the flash memory 29 from which the imager microcontroller 16b is to pull an overlay 26 to apply to the images 25.

While the camera microcontroller 18 and the imager microcontroller 16b communicate, the camera microcontroller 18 does not have access to the actual pixel data from the imager 16.

Referring generally to FIGS. 1-4, during use of the vehicle 10, the camera 11 can become misaligned with respect to the vehicle 10, and the lens 20 and the imager 16 can become misaligned with each other. This can occur gradually from a variety of factors. It can also occur suddenly, such as, during an accident. Whether gradually or suddenly (eg. because of a vehicular collision), the misalignment can occur without being detected upon visual inspection of the camera 11. The result is that the image 25 can shift in position on the imager 16. As a result, the overlays 26 or 28 applied by the microcontroller 18 to the image 25 can become misaligned with the image 25, since the image 25 is not in the position it was expected to be in when the camera 11 was initially manufactured. If the vehicle driver relies on the overlays to guide him/her during a maneuver (e.g. a backup maneuver into a parking spot), the misalignment could cause the driver to hit an obstacle that he/she believed was not in the path of the vehicle 10.

Periodically calibrating the camera 11 after it is installed in the vehicle 10 provides several advantages. One advantage is that the overlays 26, 28 applied to the image 25 by the microcontroller 18 will be properly aligned with the image 25 so that the driver of the vehicle 10 is provided with accurate position-related information from the overlays.

Figure 5:
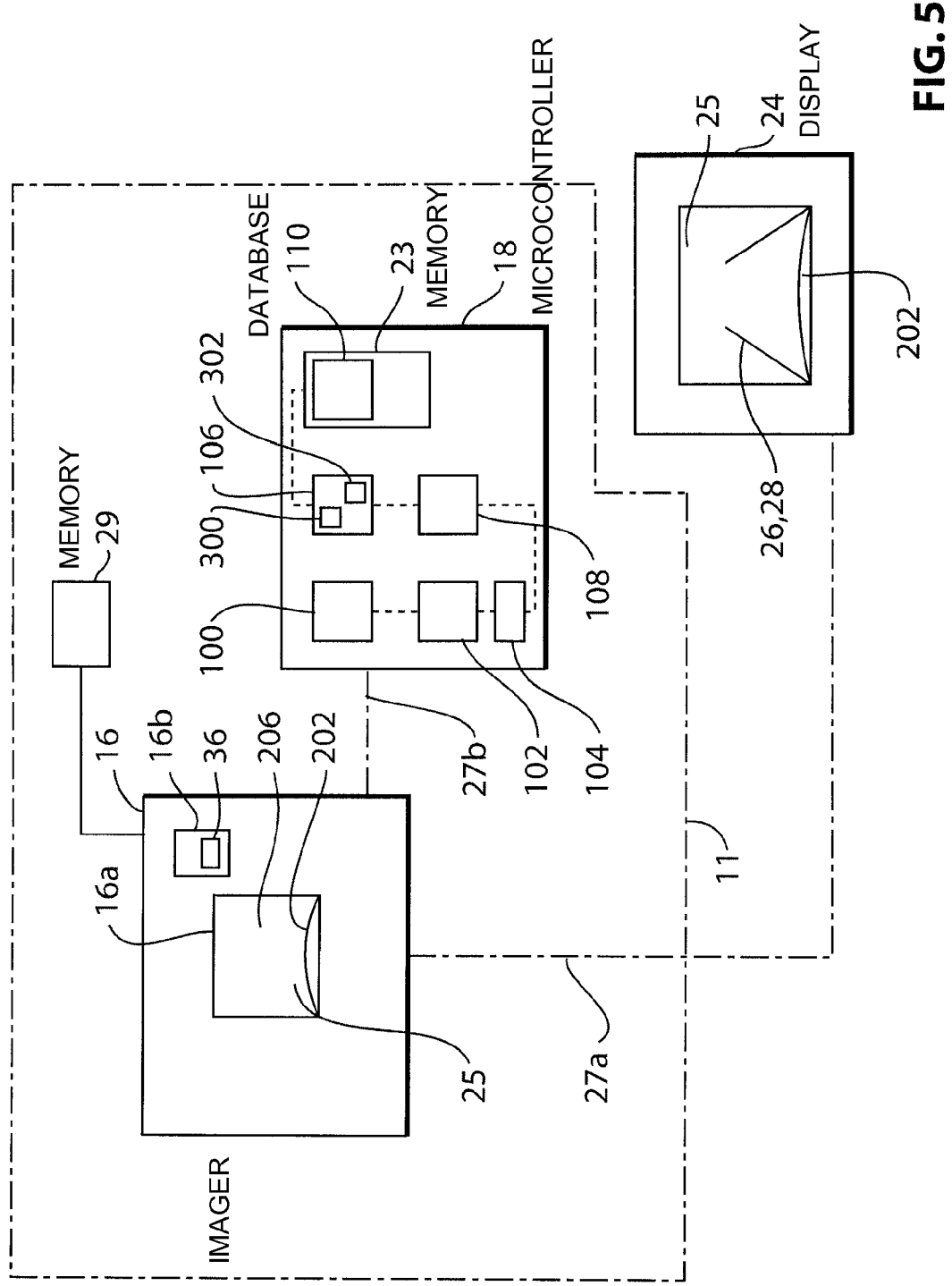
FIG. 5 is a schematic illustration of several components of the camera, communicating with a display in the vehicle shown in FIG. 1.
Figure 7A:
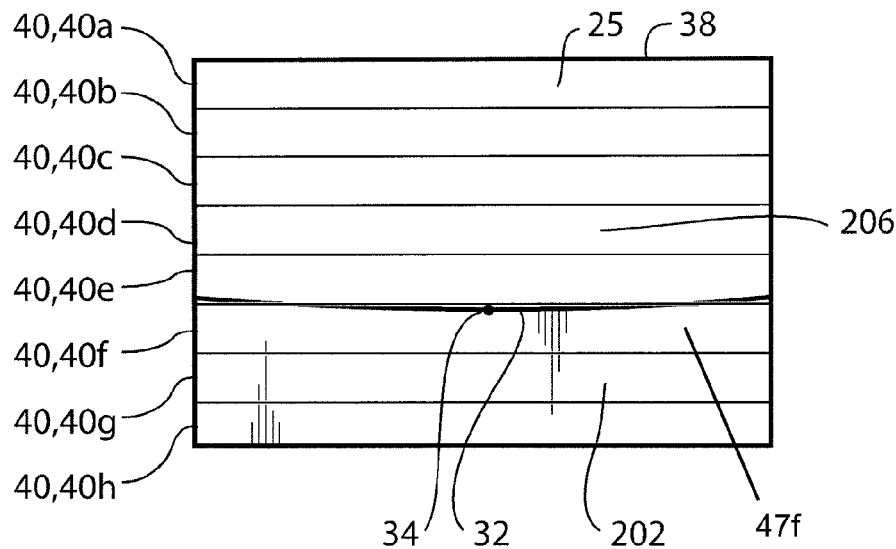
FIG. 7a is a view of a search window in an exemplary image received by the camera of FIG. 1, showing the division of the search window into a plurality of vertically stacked bars, used for determining the vertical position of a reference point in the image.
Figure 8:
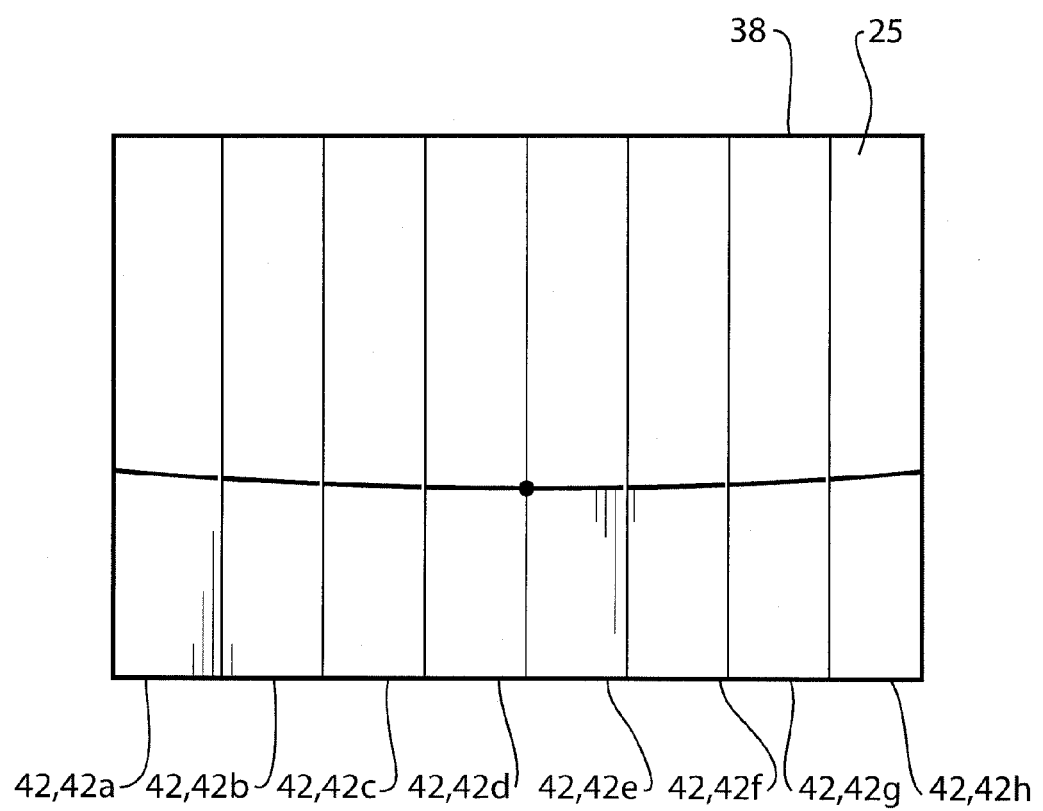
FIG. 8 is a view of a search window in an exemplary image showing the division of the search window into a plurality of horizontally stacked bars.

Referring to FIG. 5, the camera microcontroller 18 does not have access to the images 25 themselves that are received and processed by the imager 16. Instead, the imager microcontroller 16b has a statistics engine 36 which is capable of providing certain types of statistical information regarding the image 25 to the camera microcontroller 18. Referring to FIGS. 7a and 8 the statistics engine 36 (FIG. 5) can divide a selected search window 38 (ie. a selected section of the image 25), into a plurality of vertically stacked bars 40 (FIG. 7a), individually referred to at 40a-40h, or into a plurality of horizontally stacked bars 42 (FIG. 8) individually referred to at 42a-42h, and can output the sum of the greyscale values within each bar 40 or 42 to the camera microcontroller 18 (FIG. 5). In the embodiment shown, (ie. wherein the imager 16 is the MT9V126) the statistics engine 36 is configured to always break the search window 38 (FIGS. 7a and 8) into 8 bars 40 (FIG. 7a) or 42 (FIG. 8). It will be understood however, that in other embodiments, the statistics engine 36 (FIG. 5) may instead be configured to break the search window 38 into more or fewer bars 40 or 42. Preferably, in an embodiment wherein the search window 38 is divided into 8 vertically stacked bars 40 (FIG. 7a), the number of pixels (on the image sensor 16a) representing the height of the search window 38 is divisible by 8 so that each bar 40 is the same height (in terms of the number of pixels) and therefore contains the same number of pixels. Similarly, in an embodiment wherein the search window 38 is divided into 8 horizontally stacked bars 42 (FIG. 8), the number of pixels (on the image sensor 16a) representing the width of the search window 38 is divisible by 8 so that each bar 42 is the same width and therefore contains the same number of pixels.

The camera microcontroller 18 is capable of calibrating the camera 11 periodically using the statistical data provided by the imager microcontroller 16b. To calibrate the camera 11, the microcontroller 18 determines whether there is any horizontal or vertical offset in the images 25 by searching for a reference point in the images 25 and comparing its actual position to its expected position. Optionally, the microcontroller 18 may also determine whether there is any rotational offset in the images 25 by searching for a plurality of reference points in the images 25 and comparing their actual positions with their expected positions. The results of the comparisons can then be used to apply linear and optionally rotational adjustments to the positions of the overlays 26 in the images 25.

The camera microcontroller 18 initially populates a database 110 with 50 (or some other selected number of) successful reference point detection cycles before an adjustment is made to the positions of the overlays 26, and any adjustments to the positions of the overlays 26 is made based on the offsets determined in the 50 successful cycles. As an example, adjustments to the positions of the overlays 26 may be made based on the median values of the 50 past successful cycles. A successful reference point detection cycle is a reference point detection cycle that is considered acceptable for addition to the database 110. Thereafter, with each new successful reference point detection cycle, the microcontroller 18 replaces the oldest record in the database 110 with the data from the new detection cycle. After each new successful detection cycle, the microcontroller 18 may adjust the positions of the overlays 26, not based solely on the offsets found in the current detection cycle, but based on the running history contained in the database 110.

Referring to FIG. 5, in an exemplary embodiment, the camera microcontroller 18 contains several program modules including a calibration manager module 100, a pre-processing module 102, a linear offset detection module 104, a post-processing module 106 and an optional rotational offset detection module 108.

The calibration manager module 100 determines whether the conditions are appropriate to conduct any reference point detection cycle and sends control to the pre-processing module 102 if the conditions are appropriate.

Preferably, the microcontroller 18 conducts reference point detection cycles on different driving days and at different driving times, with no more than one successful reference point detection cycle per day. Preferably, reference point detection cycles are taken at selected time intervals regardless of the amount of mileage that has been accumulated by the vehicle 10.

In an embodiment, the calibration manager module 100 triggers a reference point detection cycle under the following conditions:

the vehicle is driving forward;
the in-vehicle display is not displaying camera images;
the vehicle is driving at least 40 km/hr
the vehicle's steering angle is no more than a selected amount of degrees away from zero;
the outside temperature is within a selected range;
the vehicle headlights are off;
the vehicle's heading direction is in a selected range of directions;
the vehicles wipers have been off for a selected period of time;
the time of day is within a selected range;
the amount of time the vehicle has been driving on the current trip exceeds a selected amount of time;
a valid calibration has not taken place already on the current day; and
a selected period of time has elapsed since the previous calibration.

If the above conditions are not met, the microcontroller 18 waits an additional selected period of time and then tries again to determine whether the conditions are met to trigger reference point detection cycle. If the vehicle 10 (FIG. 1) is not running after the additional selected period of time, the microcontroller 18 waits until the vehicle 10 is next turned on and checks if the conditions are met at that time. If the conditions are met, the microcontroller 18 calls the pre-processing module 102.

The pre-processing module 102 assists in the selection of an exposure value to be used on images 25 received by the imager 16, and also determines whether the image 25 will have sufficient contrast to permit the structure on which the one or more reference points is present to be distinguished clearly from the background. In the embodiment shown in the figures the aforementioned structure is the vehicle bumper 202, and the background is shown at 206. If the pre-processing module 102 determines that the contrast is not sufficient in the image 25, then the reference point detection cycle is not run.

Figure 16:
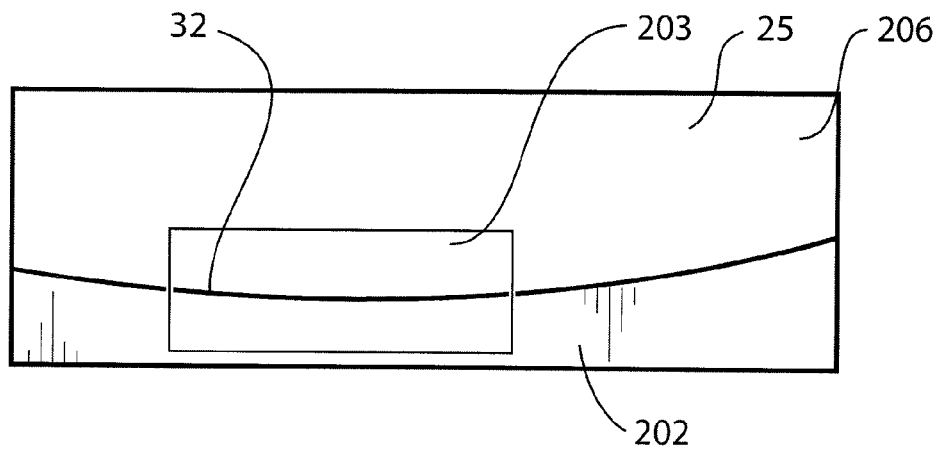
FIG. 16 is a view of the image shown FIG. 15, with an initial search window selected therein, used for the selection of an exposure value to use for the image.

In the embodiment shown in the figures, the selection of the exposure to use on the images 25 is carried out by the imager microcontroller 16*b* based on a search window 203 (FIG. 16) that is selected by the camera microcontroller 18 (FIG. 5). The camera microcontroller 18 selects a search window 203 that includes both a portion of the vehicle bumper 202 and a portion of the background 206.

Figure 15:
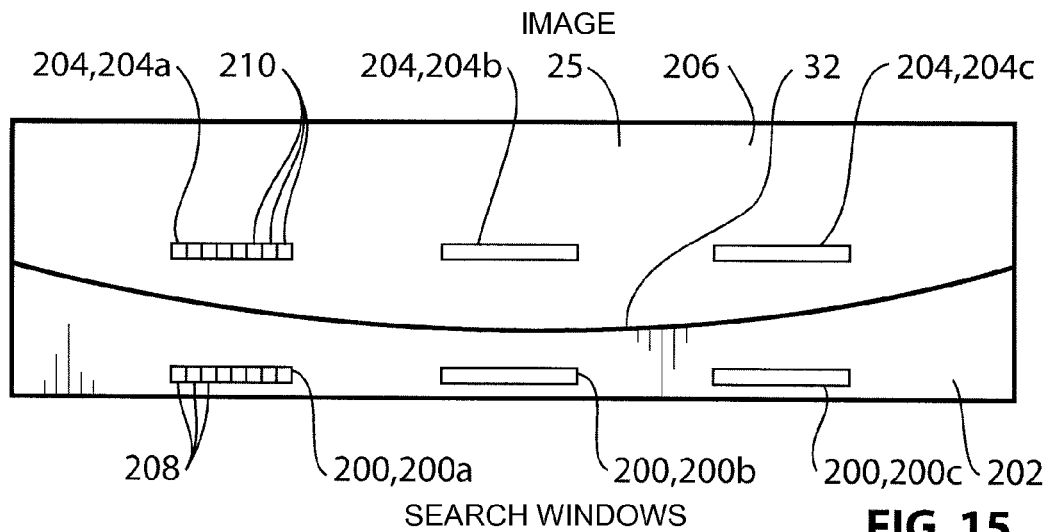
FIG. 15 is a view of an image received by the camera of FIG. 1, with a plurality of search windows selected therein, used to determine whether the contrast present in the image is sufficient to determine the position of the reference point.

Once an exposure is selected and images 25 are received by the imager 16, the pre-processing module 102 determines if the contrast in the images 25 is likely to result in successful reference point detection cycles. As noted above, the imager 16 does not provide the image 25 itself to the microcontroller 18, but instead provides statistical information regarding a search window from the image 25. In order to determine whether the contrast is good, the pre-processing module 102 processes statistical data from a plurality of search windows shown in FIG. 15, including a plurality of first search windows 200 (shown individually at 200*a*, 200*b* and 200*c*) which are on the bumper 202, and a plurality of second search windows 204 (shown individually at 204*a*, 204*b* and 204*c*) which are on the background 206. Three search windows 200 and three search windows 204 are used in the embodiment shown, however it will be understood that a different number of search windows 200 and 204 may be used.

The positions and sizes of the search windows 200 and 204 are selected so that even if the camera 11 (FIG. 2) is misaligned by some amount, there is a strong likelihood that the search windows 200 will be on the bumper 202 and that the search windows 204 will be on the background 206.

The statistics engine 36 (FIG. 5) divides each first search window 200 (FIG. 15) into 8 horizontally stacked bars 208 and outputs the sum of the greyscale values of the pixels contained in each bar 208 to the microcontroller 18 (FIG. 5). The microcontroller 18 takes the 8 sums and calculates the mean and variance of this data.

The statistics engine 36 divides each second search window 204 into 8 horizontally stacked bars 210 and outputs the sum of the greyscale values of the pixels contained in each bar 210 to the microcontroller 18. The microcontroller 18 calculates the mean and variance of the 8 sums. The microcontroller 18 then determines whether the differences in the mean values between any two of the three windows 200 are less than selected threshold values. The microcontroller 18 also determines whether the differences in the mean values between any two of the three windows 204 are less than selected threshold values. The microcontroller 18 also determines whether the difference in the mean values of each vertically adjacent pair of a window 200 and a window 204 is greater than a selected threshold value. In other words, the microcontroller 18 checks if the difference between the mean values of the windows 200*a* and 204*a* is greater than a selected value, and checks if the difference between the mean value of the windows 200*b* and 204*b* is greater than a selected value, and so on. Additionally, the microcontroller 18 also determines if the variance of each window 200 and 204 is less than a selected threshold value. If all of the above conditions are met, then the pre-processing module 102 permits an reference point detection cycle to be carried out. If any of these conditions are not met, then an reference point detection cycle is not carried out at that time.

In some embodiments, it is possible that the pre-processing module 102 could be programmed to determine a suitable exposure to use for the images 25 received by the imager 16. In one example, the pre-processing module 102 could iteratively select exposures to use, refining each selection based on the results of the comparisons using the mean values and variances described above.

Figure 6A:
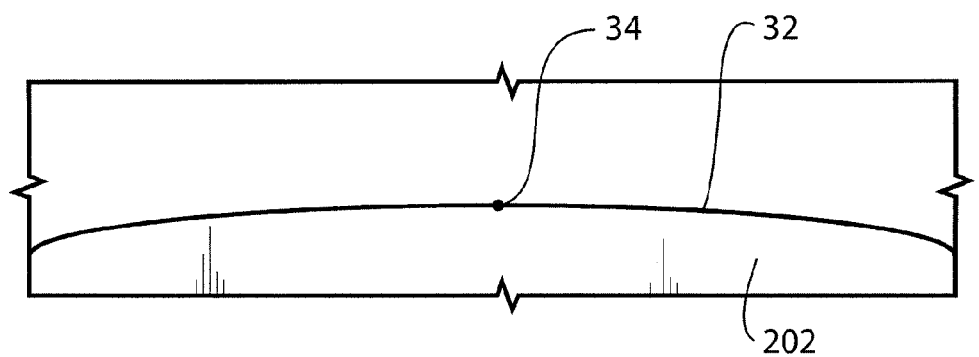
FIGS. 6a and 6b are exemplary views from the camera of the bumper of the vehicle shown in FIG. 1.
Figure 6B:
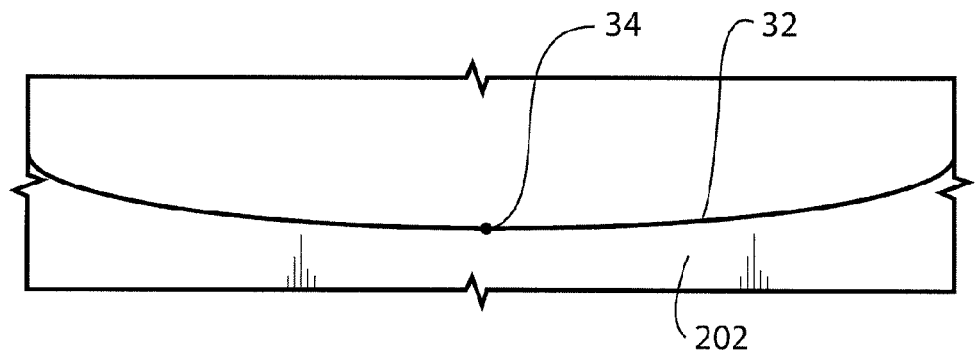

The linear offset detection module 104 determines the position of a first reference point in the image 25. The reference point to search for depends on the position of the camera 11. For example, in embodiments wherein the camera 11 is a tailgate-mounted rearview camera (as shown in FIG. 1), the first reference point may be a point on the vehicle bumper 202. In FIGS. 6a and 6b, the edge of the bumper 202 is shown at 32. As can be seen, the bumper edge 32 appears curved due to distortion in the image 25. Regardless of whether the bumper edge 32 is domed, as shown in FIG. 6a, or is dished as shown in FIG. 6b, the curved bumper edge 32 has an extremum, which is shown at 34. The extremum 34 may also be referred to as the first reference point 34.

Using the statistical information from the statistics engine 36 (FIG. 5), the microcontroller 18 can determine the position of the extremum 34 (FIGS. 6a, 6b).

The microcontroller 18 (FIG. 5) may first search for the vertical position of the first reference point 34, and may then search for the horizontal position of the first reference point 34.

Initially, a search window 38 (FIG. 7a) is selected by the microcontroller 18. The properties (ie. the size and position) of the search window 38 may initially be selected by the microcontroller 18 (FIG. 5) based on the estimated position of the first reference point 34. The search window 38 selected in the exemplary embodiment shown in FIG. 7a is 240 pixels wide by 160 pixels high.

The sums of the greyscale values of the vertically stacked bars 40 shown in FIG. 7a are generated by the statistics engine 36 and sent to the microcontroller 18. The sums are represented mathematically as VAL(n), where n is the numerical position of the image bar 40 in the search window 38 (and is thus a value between 1 and 8 inclusive).

The microcontroller 18 calculates the absolute values of gradients associated with the image bars 40 (referred to as absolute gradients). The absolute gradient at a particular image bar 40 is referred to as GRAD(n), where n is the numerical position of a particular image bar 40 in the search window 38. The absolute gradient is calculated as follows:

$$GRAD(n) = \frac{ABS[(VAL(n+1) - VAL(n)) + (VAL(n) - VAL(n-1))]}{2}$$
$$= \frac{ABS[VAL(n+1) - VAL(n-1)]}{2}$$

Put in word form, the absolute gradient GRAD(n) of the nth image bar is the absolute value of the sum of brightness values in the next image bar minus the sum of brightness values in the preceding image bar, all divided by 2. It will be understood that the formula above can be used for the second image bar 40b through to the seventh image bar 40g (ie. the second-to-last image bar). For the first image bar 40a:

GRAD(1)=ABS[VAL(2)−VAL(1)]

For the eighth (ie. last) image bar 40h:

GRAD(8)=ABS[VAL(8)−VAL(7)]

Figure 7B:
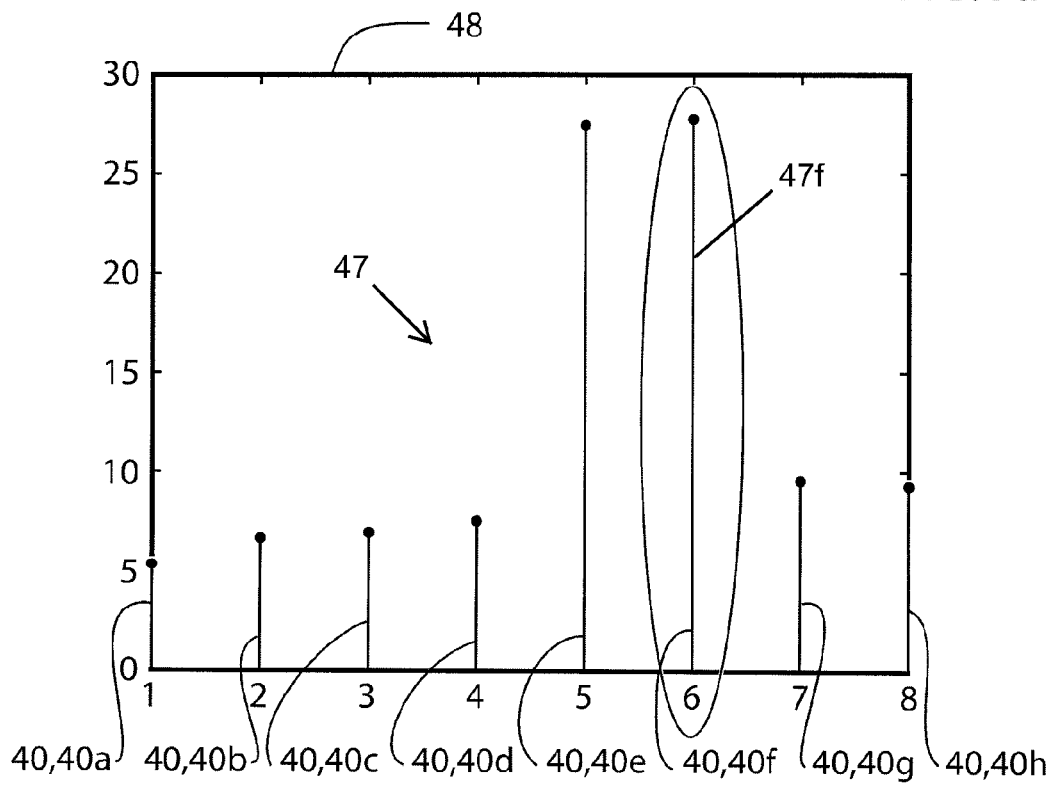

The absolute gradients GRAD(1) to GRAD(8) are shown graphically at 47 in the chart 48 shown in FIG. 7b. The microcontroller 18 (FIG. 5) processes the absolute gradients to find the position of the image bar 40 (FIG. 7a) having the largest associated gradient value. For the example shown in FIG. 7b, the absolute gradient 47f is the largest gradient, corresponding to the sixth image bar 40f.

It will be noted that the position of the first reference point 34 may not necessarily be in the image bar 40 with the highest gradient. It could at least theoretically be in the image bar 40 up from that one (where the bumper edge 32 appears domed) or in the image bar down from that one (where the bumper edge 32 appears dished). In the image 25 shown in FIG. 7a it does happen to be in the image bar 40 with the highest gradient however.

Figure 9A:
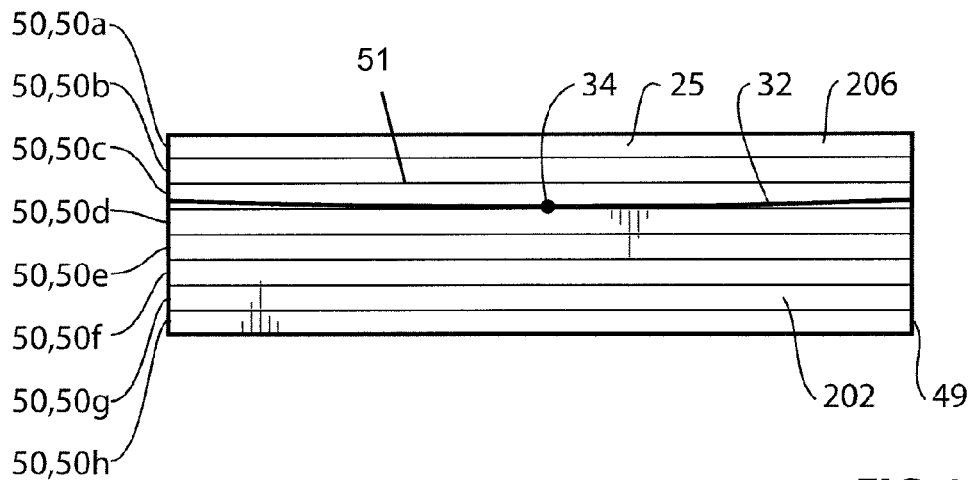
FIG. 9a is a view of a second search window in the exemplary image shown in FIG. 7a, divided into a plurality of vertically stacked bars.

The microcontroller 18 then selects a second, narrower search window, shown at 49 in FIG. 9a and divides it into 8 vertically stacked bars 50 (shown individually at 50a-50h). The position of the second search window 49 is selected based on which image bar 40 (FIG. 7a) in the first search window 38 had the largest gradient (ie. the sixth image bar 40f in the example shown in the figures). In the embodiment shown, the second search window 49 (FIG. 9a) is preferably positioned to ensure capture of the first reference point 34 somewhere within the image bars 50b-50g. In the present embodiment, the microcontroller 18 positions the top of the second search window 49 the equivalent of the height of two image bars 40 from FIG. 7a (ie. a total of 40 pixel rows) up from the bottom of the image bar 40f (represented in FIG. 9a at 51). The second search window 49 is 64 pixels rows high, and so the second search window 49 extends 24 pixel rows below the bottom of the image bar 40f (FIG. 7a).

Figure 9B:
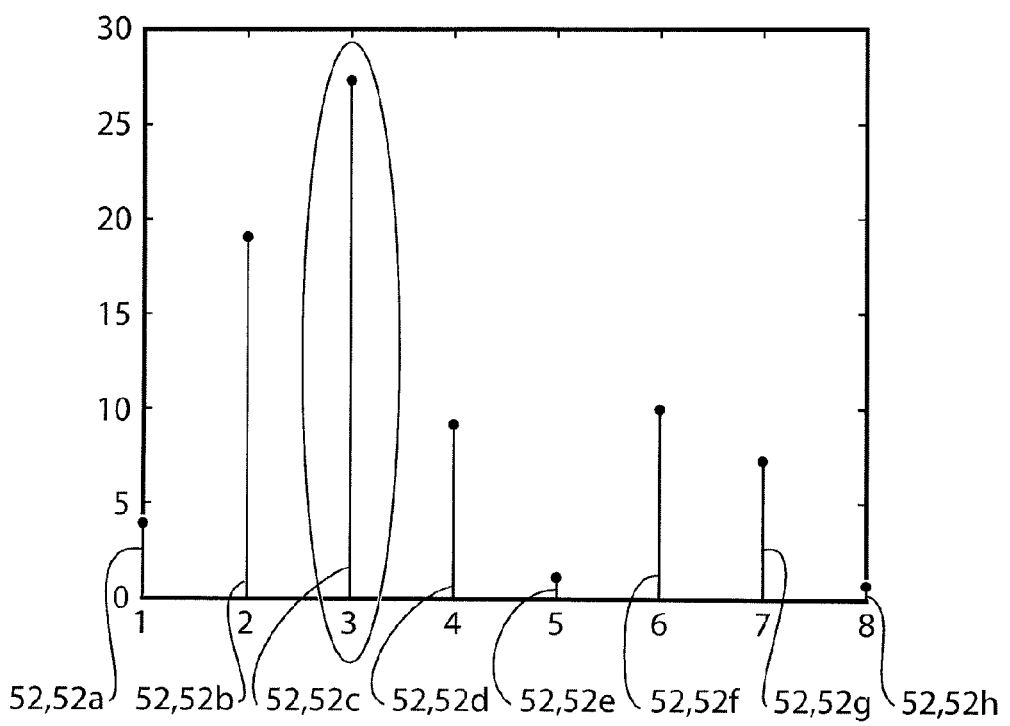

The absolute gradient calculations and analysis are performed on the second search window 49 to find which image bar 50 has the highest associated gradient. The resulting gradients are shown at 52 (and individually at 52a-52h), in the chart in FIG. 9b. As can be seen, the absolute gradient shown at 52c is the highest in the chart in FIG. 9b, and is associated with the image bar 50c in FIG. 9a.

Figure 10A:
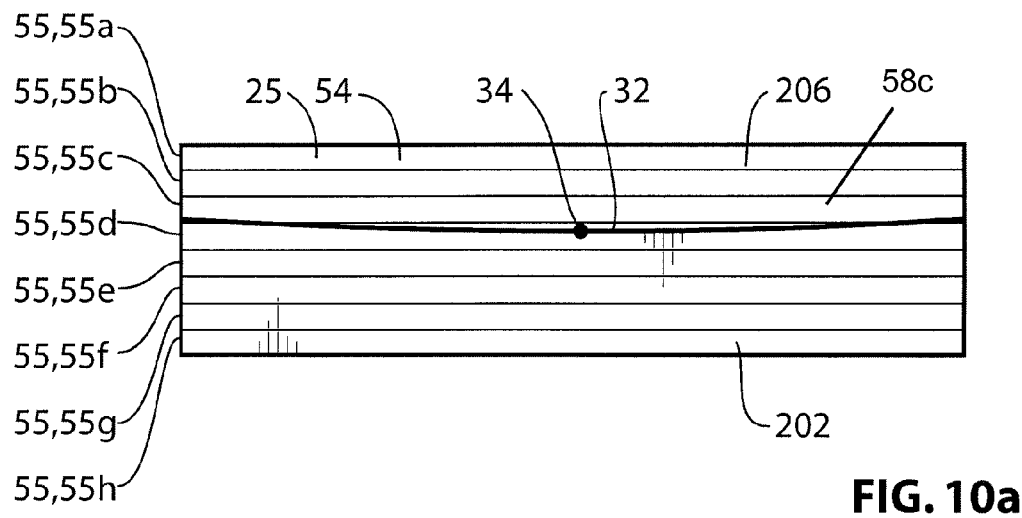
FIG. 10a is a view of a third search window in the exemplary image shown in FIG. 7a, divided into a plurality of vertically stacked bars.

The microcontroller 18 selects a third search window shown at 54 in FIG. 10a, which is 240 pixels wide×32 pixels high. The position of the third search window 54 is based on the position of the image bar 50c (FIG. 9a). The position of the top of the third search window 54 is selected to be the equivalent of the height of two image bars 50 from FIG. 9a (ie. 16 pixel rows) up from the bottom of the image bar 50b.

Figure 10B:
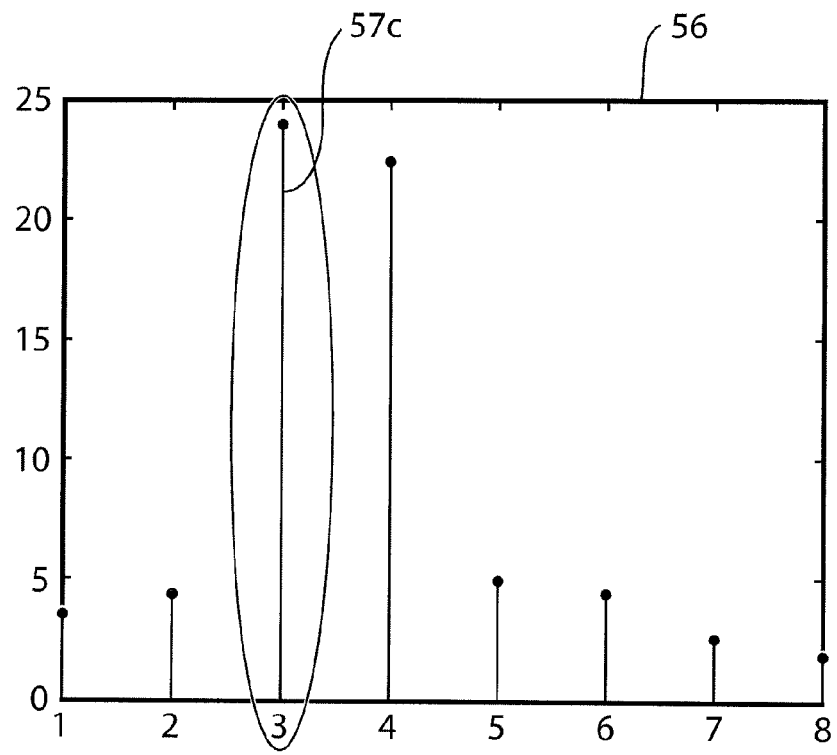

The microcontroller 18 divides the third search window 54 (FIG. 10a) into 8 vertically stacked image bars 55, (shown individually at 55a-55h), each of which is 4 pixels high, and performs the absolute gradient calculations thereon. The resulting gradient chart is shown at 56 in FIG. 10b. The individual gradient shown at 57c, which is associated with the third image bar, shown at 58c in FIG. 10a, is the highest gradient in the chart.

The microcontroller 18 selects a fourth search window 60 (FIG. 11a), which is 240 pixels wide×16 pixels high, based on the position of image bar 55c (FIG. 10a). The top of the fourth search window 60 is selected to be 2×height of the image bars 55 (ie. 2×4=8 pixels) upwards from the bottom of the image bar 55c (FIG. 10a).

Figure 11A:
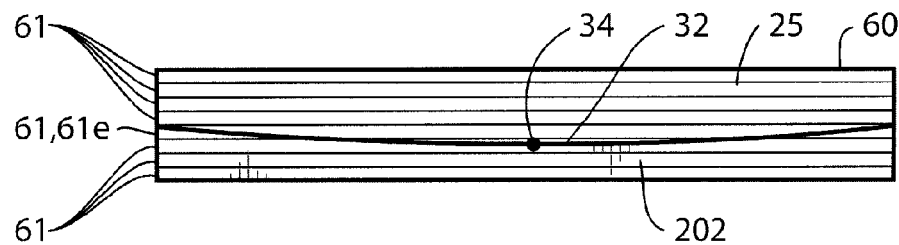
FIG. 11a is a view of a fourth search window in the exemplary image shown in FIG. 7a, divided into a plurality of vertically stacked bars.
Figure 11B:
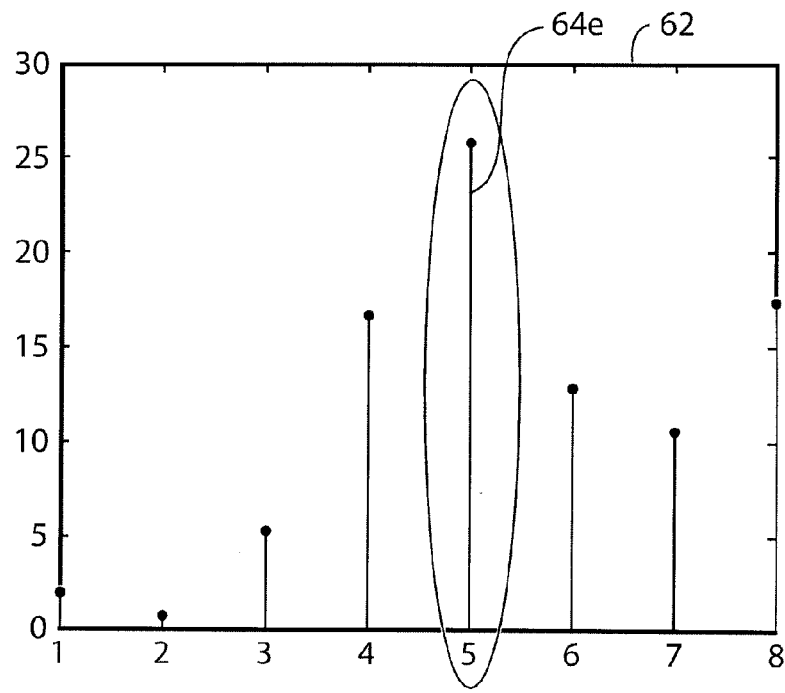

The microcontroller 18 divides the fourth search window 60 (FIG. 11a) into 8 vertically stacked image bars 61, each of which is 2 pixels high, and performs the absolute gradient calculations on the fourth search window 60. The resulting gradient chart is shown at 62 in FIG. 11b. The absolute gradient shown at 64e, which is associated with the fifth image bar, shown at 61e in FIG. 11a, is the highest gradient in the chart.

The microcontroller 18 selects a fifth search window 66 (FIG. 12a) which is 240 pixels wide×8 pixels high, based on which image bar 61 (FIG. 11a) had the largest gradient (ie. the fifth image bar 61e). The top of the fifth search window 66 is 2×height of the image bars 61 (ie. 2×2=4 pixels) upwards from the bottom of the image bar 61e.

Figure 12A:
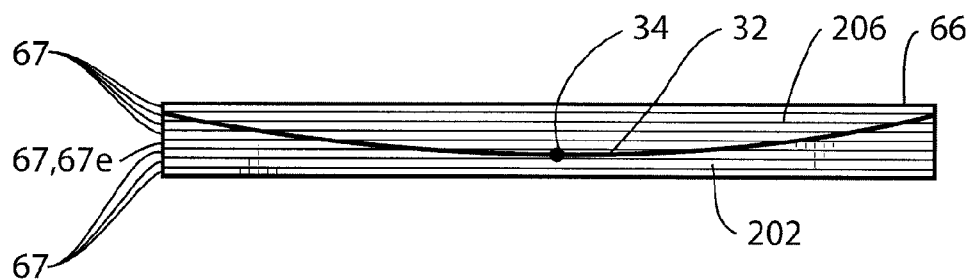
FIG. 12a is a view of a fifth search window in the exemplary image shown in FIG. 7a, divided into a plurality of vertically stacked bars.
Figure 12B:
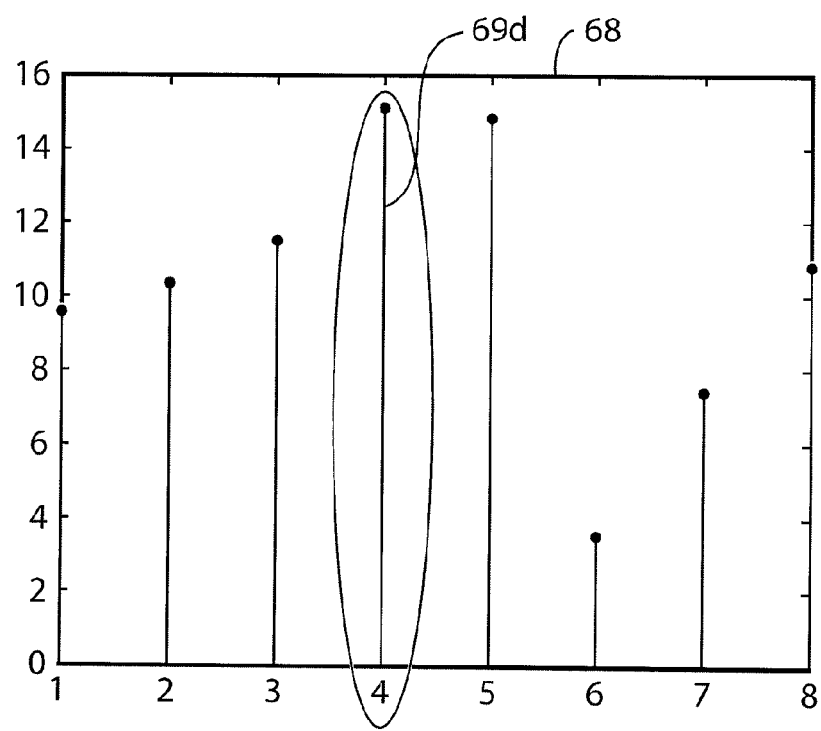

The microcontroller 18 divides the fifth search window 66 into 8 vertically stacked image bars 67, each of which is 1 pixel high, and performs the absolute gradient calculations thereon. The resulting gradient chart is shown at 68 in FIG. 12b. The absolute gradient shown at 69d, which is associated with the fourth horizontal image bar, shown at 67d in FIG. 12a, is the highest gradient in the chart. The vertical pixel position of the image bar 67d is determined by the microcontroller 18 to be the vertical pixel position of the first reference point 34.

Figure 13A:
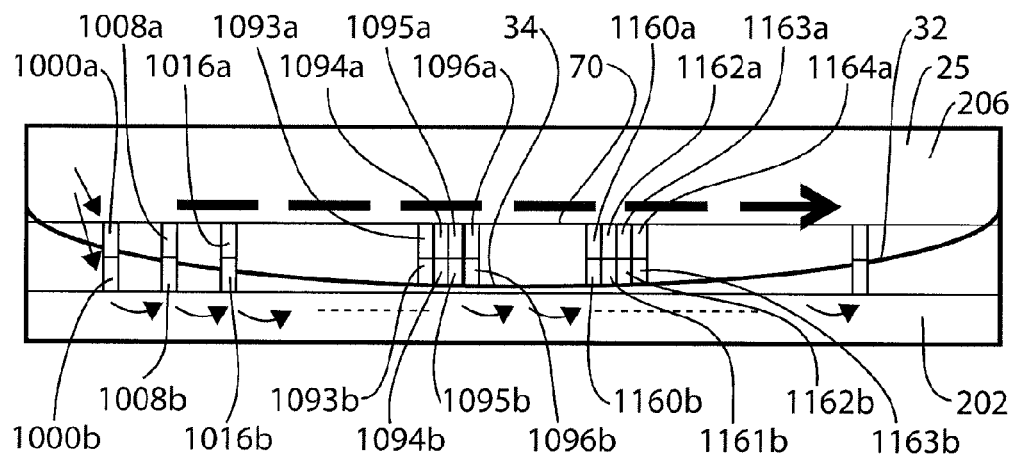
FIG. 13a is a view of a region of interest in which a plurality of search windows are selected, for determining the horizontal position of the reference point.

To determine the horizontal position of the first reference point 34, the microcontroller 18 (FIG. 5) selects a region of interest 70 (FIG. 13a) and scans it for the presence of the bumper edge 32. The region of interest 70 may be about 240 pixels wide by 16 pixels high. The region of interest 70 is centered horizontally in the image 25. Vertically, the region of interest 70 extends from 12 pixels above the determined vertical position of the first reference point 34, to 4 pixels below the determined vertical position of the first reference point 34.

The microcontroller 18 selects two first search windows 1000a and 1000b that are each 1 pixel wide×8 pixels high, thereby forming a single compound search window that is 1 pixel wide×16 pixels high. The microcontroller 18 obtains the greyscale values of each pixel in the two search windows 1000a and 1000b and determines which pixel out of the 16 pixels has the highest associated gradient. That pixel represents the bumper edge 32, and so the microcontroller 18 stores the position of that pixel in memory. The microcontroller 18 then selects two second search windows 1008a and 1008b which are 8 pixels to the right of the first search windows 1000a and 1000b. The microcontroller 18 determines the greyscale values of each pixel in the two windows 1008a and 1008b and determines the pixel with the highest gradient among them and stores its position in memory. The microcontroller 18 then selects another pair of search windows 1016a and 1016b and determines the pixel with the highest gradient among them. The microcontroller 18 continues along the region of interest 70 selecting vertically stacked pairs of search windows at 8 pixel intervals.

Figure 13B:
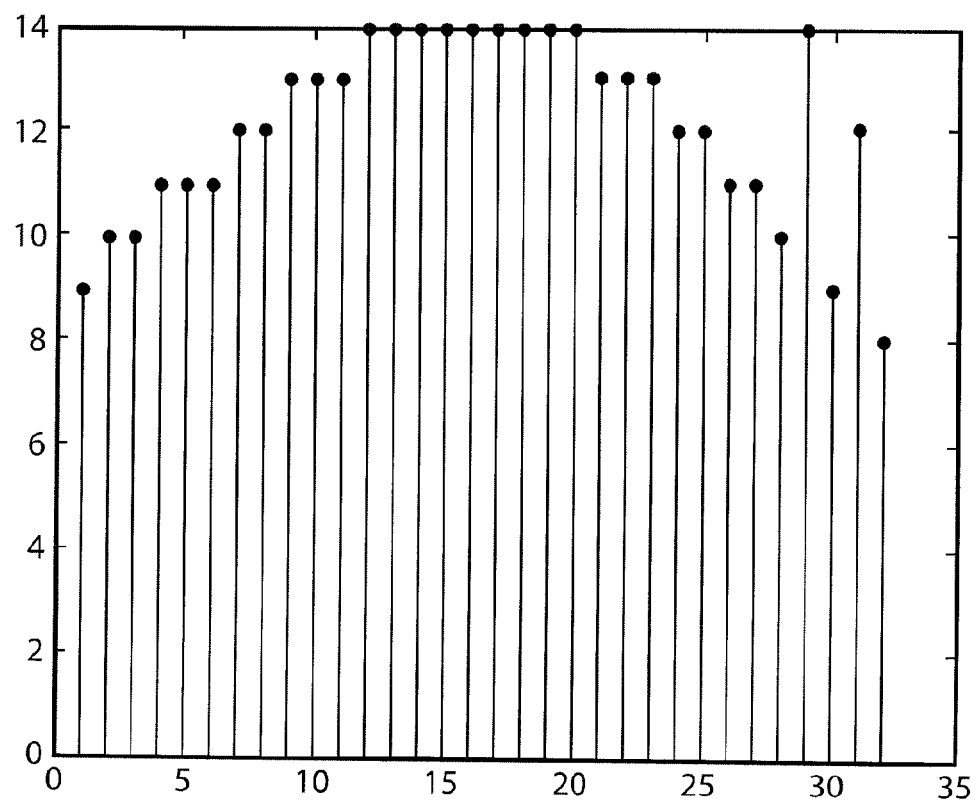

The chart shown in FIG. 13b illustrates the pixel position values stored by the microcontroller 18 across 32 pairs of search windows. The pixel position values may be stored in a vector having a dimension of 1×32. The data contained in the vector may be conditioned and validated as follows, to account for problems that can arise, such as a change in the ambient environment seen by the camera 11 after the preprocessing module 102 (FIG. 5) has approved the cycle to proceed with detecting the reference point 34.

The conditioning of the data in the vector takes place based on one or more rules that are applied to the data. A first rule is that the pixel position value of the first element in the vector, (ie. the pixel position value corresponding to the search windows 1000a and 1000b), cannot be larger than that of the second element in the vector (ie. cannot be larger than the pixel position value of the subsequent search windows 1008a and 1008b). If it is larger, its value is reduced to be the same as that of the second element. A second rule is that, if the pixel position value of any particular vector element (referred to as vector element (i) where i corresponds to its position in the vector) is less than that of the immediately preceding vector element (ie. vector element (i−1)) and that of the immediately proceeding vector element (ie. vector element (i+1)) and if the immediately preceding and immediately proceeding vector elements have the same pixel position value as each other, then the pixel position value of the particular vector element (ie. vector element (i) is changed to match that of the immediately preceding and immediately proceeding vector elements. A third rule is that if the pixel position value of any particular vector (ie. vector element (i)) is greater than that of vector element (i+1) and is greater than that of vector element (i−1), and if the pixel position value of vector element (i+1) is greater than that of vector element (i−1), then the pixel position value of vector element (i) is changed to match that of vector element (i+1). A fourth rule is similar to the third rule. If the pixel position value of any particular vector (ie. vector element (i)) is greater than that of vector element (i+1) and is greater than that of vector element (i−1), and if the pixel position value of vector element (i−1) is greater than that of vector element (i+1), then the pixel position value of vector element (i) is changed to match that of vector element (i−1). A fifth rule is that if the pixel position value of the last vector element, (ie. vector element (32)), is greater than that of the preceding vector element (ie. vector element (31)), then the value of the last vector element is changed to match that of the preceding vector element. A sixth rule is that if the highest pixel position value stored in the vector appears less than 4 times in the vector, then the pixel position values of the associated vector elements are changed to match the second highest pixel position value stored in the vector. It will be noted that the particular rules described above are based on knowledge a priori of what general shape the bumper 202 should have in the image 25. It will be noted that the aforementioned rules are intended as exemplary. It is alternatively possible for the system to apply a different set of rules to condition the values in the vector. It will be noted that the rules may change depending on the vehicle model on which the camera 11 is installed.

Once the pixel position values stored in the vector are conditioned using the aforementioned rules, the values are tested to determine if they are considered valid to determine whether the reference point detection can continue or whether to abandon the reference point detection cycle until some other time. The conditions checked to determine whether the values are valid may include one or more of the following 5 questions:

1. Is the highest pixel position value between 11 and 13?

2. Does the highest pixel position value appear at least 3 times in the vector?

3. Is the number of times that the highest pixel position value appears between the first occurrence of it (at vector element (i)) and the last occurrence of it (at vector element (j), greater than or equal to (j−i)/2, where i and j are the values of the positions in the vector corresponding to the first and last occurrences of the highest pixel position value respectively?

4. Are the pixel position values of the first and last vector elements less then highest pixel position value present in the vector?

5. Are the pixel position values of all the vector elements between the first and last occurrences of the highest pixel position values greater than or equal to 11?

For the above questions, any 'no' answer may be referred to as a glitch. A variable (which is given the name 'count1') stores the number of 'rising glitches' (ie. glitches where the pixel position value of vector element (i)>the pixel position value of the vector element (i+1)).

A variable (which is given the name 'count2') stores the number of 'falling glitches' (ie. glitches where the pixel position value of vector element (i)<the pixel position value of the vector element (i+1)).

A variable (which is given the name 'count3') stores the number of 'flat glitches' (glitches where the pixel position value of vector element (i) is not equal to highest pixel position value).

If Count1+count2+count3=>5 then the reference point detection cycle is abandoned.

For any glitch, the glitch amplitude corresponds to how far past the given limit the pixel position value was for any given vector element. If there are more than 3 glitches having a glitch amplitude of more than 3, then the reference point detection cycle is abandoned.

If the reference point detection cycle has not been abandoned based on the aforementioned questions, the vector is passed through a 5 taps median filter. The filter goes through each vector element (i), and determines a median value for a group of 5 vector elements centered on element (i) (ie. the group of vector elements consisting of vector element (i−2), vector element (i−1), vector element (i), vector element (i+1) and vector element (i+2)). The filter then changes the value of the vector element (i) to the determined median value. It will be understood that the 5 taps median filter is an optional procedure. It is possible for the vector to be used as is without being passed through the filter. It is alternatively possible for the vector to be filtered in any other suitable way.

As can be seen in the chart, the pixel position value (in this case a value of 14) is the same for the search window pairs 1096a, 1096b to 1160a, 1160b (FIG. 13a), and so the actual horizontal position of the first reference point 34 is somewhere between them.

First, the microcontroller 18 determines whether the same pixel position value (in this case a value of 14) is found for search window pairs 1095a, 1095b to 1089a, 1089b that are immediately to the left of the pair 1096a, 1096b, and for search window pairs 1161a, 1161b to 1167a, 1167b that are immediately to the right of the pair 1160a, 1160b.

Figure 14A:
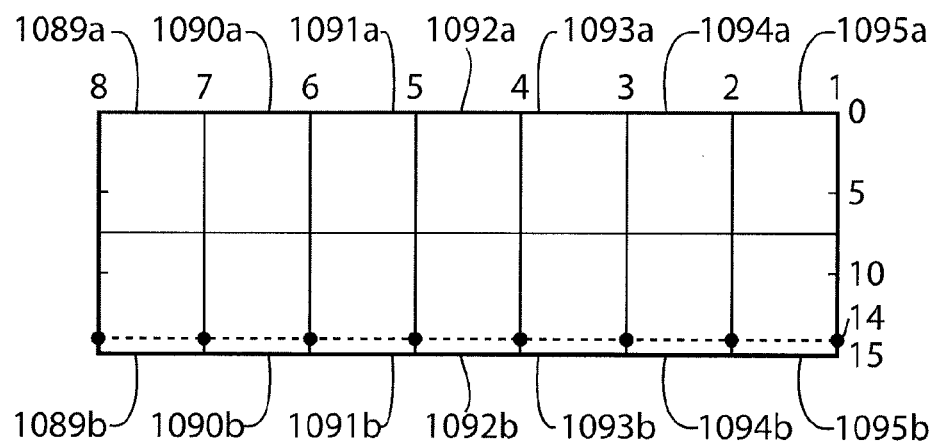
FIG. 14a a view of a plurality of selected search windows in the region of interest shown in FIG. 13a to refine the determination of the horizontal position of the reference point.
Figure 14B:
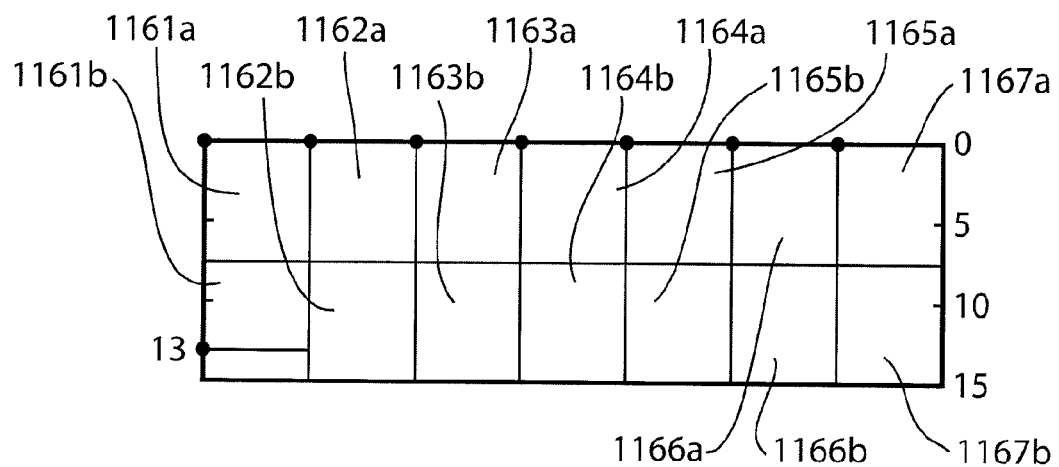
FIG. 14b is a view of another plurality of selected search windows in the region of interest shown in FIG. 13a to refine the determination of the horizontal position of the reference point.

Referring to FIG. 14a, the microcontroller 18 determines in the exemplary embodiment, that the pixel position value remains at 14 for all the search window pairs 1095a, 1095b to 1089a, 1089b. Referring to FIG. 14b, the microcontroller 18 determines that the pixel position value drops to 13 at the first search window pair 1161a, 1161b to the right of the window pair 1160a, 1160b. Accordingly, no further pixel position values are necessary to be determined to the right of that.

To determine the horizontal position of the first reference point 34, the microcontroller 18 determines the middle (horizontally) between the leftmost search window pair and the rightmost search window pair that have the same peak pixel position value. In the particular example shown, the leftmost search window pair is shown at 1089a, 1089b, and the rightmost search window pair is shown at 1160a, 1160b. The two window pairs are 71 pixels apart horizontally. The middle of the peak is therefore 36 pixels to the right of search window pair 1089a, 1089b, and is determined by the microcontroller 18 to be the horizontal position of the first reference point 34.

Referring to FIG. 5, it will be noted that the above description provides one way of determining the vertical and horizontal positions of the first reference point 34. It is alternatively possible for the microcontroller 18 to determine the position of the first reference point 34 by any other suitable method, using the statistical data that is provided by the imager microcontroller 16b and without access to the image 25 itself. Additionally, the algorithm itself may be different for different models of vehicle and different cameras, and for different locations for the camera. For example, certain portions of the algorithm may change depending on whether the vehicle bumper 202 appears dished or domed in images 25 taken by the camera 11. Also certain portions of the algorithm will change depending on the location of the camera 11 in the vehicle 10, since the particular structure on which the reference point is positioned and the associated background, changes depending on whether the camera 11 is side mounted camera or a rear mounted camera.

Once the horizontal and vertical pixel values of the first reference point 34 are determined, the database 110 (FIG. 5) of calibration data is updated. These values are simply added to the database 110 if the database 110 isn't full. If the database 110 is already full, these values are used to overwrite the oldest reference point data contained in the database 110. The database 110 may be configured to hold data from 50 reference point detections cycles. Each record of the database 110 contains the horizontal and vertical pixel positions of the first reference point 34, the date and time and optionally other data. In total each record may take up 16 bytes of memory, including ten bytes for the horizontal and vertical pixel positions, the date and time, and 6 bytes for additional data. Thus, the total amount of memory required for 50 records is 800 bytes.

The post-processing module 106 is used to determine whether or not to adjust the positions of the overlays 26 based on the database 110 of calibration data. In one embodiment, the post-processing module 106 is itself made up of two modules including a statistics analysis module 300 and a decision logic module 302. The statistics analysis module 300 determines the mean values, the variance for the horizontal and vertical pixel positions in the database 110, the median of the pixel position data and the mode for the pixel position data, and the variance for the time of day data in the database 110.

Based on the results of the analysis conducted by the statistics analysis module 300, the decision logic module 106 determines whether or not to adjust the positions of the overlays 26. The actual adjustment that is made to the positions of the overlays 26 may be selected based on the entirety of the pixel position data in the database 110, not just on the currently determined pixel position values. It will be noted that the vertical and horizontal pixel positions of the overlays 26 are independent from one another. As such, it is possible that one coordinate (eg. the vertical position) of the overlays 26 may be adjusted, while the other coordinate (eg. the horizontal position) of the overlays 26 is not adjusted. For example, in one embodiment, if the amount of horizontal offset between the horizontal position detected for the reference point 34 and the horizontal position currently used by the camera 11 is greater than 4 pixels, then the horizontal position used by the camera 11 for the overlays 26 will be updated. Separately, if the amount of vertical offset between the vertical position detected for the reference point 34 and the vertical position currently used by the camera 11 is greater than 2 pixels, then the vertical position used by the camera 11 for the overlays 26 will be updated.

If the microcontroller 18 determines that the amount of overall offset exceeds a selected amount, the microcontroller 18 notifies the vehicle driver that the camera 11 may be too far outside of its intended operating position and may require servicing. This can be especially useful in situations where the camera 11 has become seriously misaligned with the vehicle 10 or if the lens 20 has become significantly misaligned with the imager 16 due, for example, to a collision wherein damage to the camera 11 or vehicle tailgate has occurred and has gone unnoticed.

The optional rotational offset detection module 108 (FIG. 5) detects if the camera 11 has any rotational offset so that this can be taken into account when adjusting the positions of the overlays 26.

Figure 17:
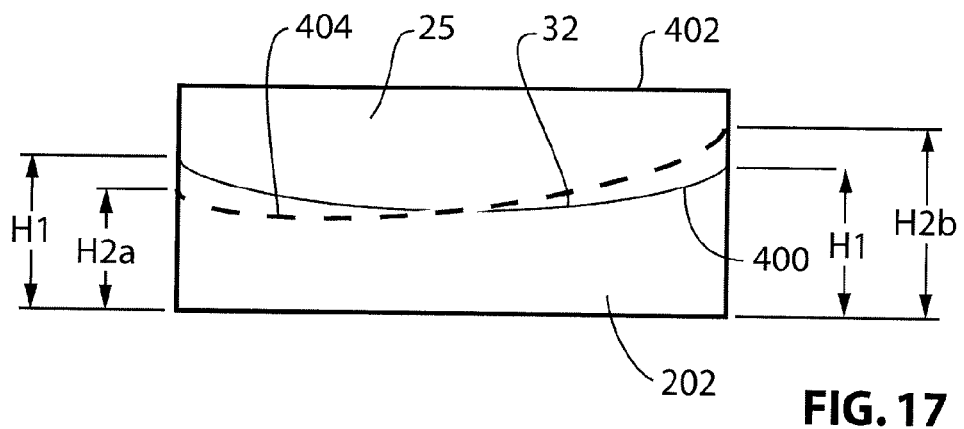
FIG. 17 is a view of a search window in an exemplary image illustrating a rotational offset for the camera.

If the lens 20 (FIG. 2) and image sensor 16a were perfectly oriented, the curved line corresponding to the bumper's edge 32 (FIG. 17) in the image 25 would appear as shown at 400 in the rotation angle search window shown at 402 in FIG. 17, and would intersect with the side edges of the search window 402 at a height H1 on both the left and right sides. In situations where the lens 20 (FIG. 2) and the image sensor 16a are not oriented perfectly, the curved line corresponding to the bumper's edge 32 appears skewed as shown at 404 and would intersect with the side edges of the search window 402 at different heights, as shown by H2a and H2b. The width of the search window 402 is shown at W.

The rotation angle search window 402 may be selected based on the detected vertical position of the first reference point 34 (FIG. 7a), and may extend a selected number of pixels above and below the vertical position of the first reference point 34, based on whether the bumper 202 appears domed or dished in the image 25 (this would be programmed into the module 108 during vehicle assembly). The width of the rotation angle search window 402 may be selected to ensure bumper edge 32 leaves the search window 402 at a point along the sides of the search window 402, and not on the top or bottom of the search window 402.

To determine the pixel positions at which the bumper edge 32 leaves the search window 402, the microcontroller 18 selects a first compound search window that is 1 pixel wide by 16 pixels high, and is thus made up of a pair of 1 pixel by 8 pixel search windows, along the left side of the search window 402. The pixel position representing the highest gradient in that compound search window is the pixel position at which the bumper edge leaves the left side of the search window 402. Similarly, the microcontroller 18 selects a second compound search window on the right side of the search window 402 and determines the pixel with the highest associated gradient to determine the pixel position at which the bumper edge leaves the right side of the search window 402. By applying the following formula the rotation angle of the camera 11 can be determined:

$$\text{Camera angle} = \arctan((H2b - H2a)/W)$$

Once the camera angle is determined, it can be compared to historical data for the camera angle that is optionally contained in the database 110 and can be used to adjust the positions of the overlays 26. As can be seen in FIG. 17, the rotation angle can affect the horizontal (and the vertical to a lesser extent) position of the extremum of the curve representing the bumper edge 32. Thus, a rotational change in the camera could cause the linear offset detection module 104 (FIG. 5) to find a horizontal shift in the camera's position. By detecting the rotation angle of the camera 11, any contribution made by the rotation angle to the determined linear offset can be adjusted for.

Optionally, the camera 11 may be capable of being calibrated at night. To provide this capability, the camera 11 may include a NIR (near infra-red) LED (shown at 11a in FIG. 1) that is activated when the reference point detection and the camera angle detection are being carried out. For efficiency the NIR LED 11a may have a narrow illumination pattern and may be directed generally towards the bumper's edge 32 (FIG. 1). The reflection from the bumper 202 will be stronger than the reflection from the background, thereby providing relatively high contrast at the bumper's edge 32.

It will be noted that the calibration of the camera 11 can be carried out without the need to add any structure to the vehicle than is already present thereon (ie. without the need to add targets or other calibration-specific structure to the vehicle 10), and without the need for additional structure or modification to the camera 11 itself.

In addition to calibrating the camera 11 periodically after the vehicle 10 has been bought, the above-described camera 11 can be calibrated as described prior to the vehicle 10 leaving the assembly plant. Additionally or alternatively, the camera 11 can be calibrated when the vehicle 10 is at the dealer, prior to being sold or during a servicing of the vehicle 10. For example, a technician/service person at a vehicle dealer can send a signal to the camera 11 to enter a 'service mode' to facilitate its use in calibrating itself.

While the above description constitutes a plurality of embodiments of the present invention, it will be appreciated that the present invention is susceptible to further modification and change without departing from the fair meaning of the accompanying claims.

The invention claimed is:

1. A camera for a vehicle, said camera comprising:
a lens positioned to capture a view behind a vehicle, wherein the view includes a portion of the bumper of the vehicle;
an imager including an image sensor and an imager microcontroller, wherein the image sensor is positioned to receive images from the lens;
a camera microcontroller configured to control the application of an overlay to the images, wherein the camera microcontroller is operable to receive data from the imager microcontroller relating to bars of pixels on the image sensor, wherein the camera microcontroller is further operable to detect a reference point in the images using the data and is operable to determine an offset amount with which to shift the overlay on the images; and
wherein the camera microcontroller is operable to detect the reference point iteratively using data from the imager microcontroller relating to successively smaller bars of pixels on the image sensor.

2. A camera as claimed in claim 1, wherein the imager microcontroller is operable to transmit the images to an in-vehicle display via an analog signal.

3. A camera as claimed in claim 1, wherein, prior to detecting the reference point, the camera microcontroller determines whether there is sufficient contrast in the images.

4. A camera for a vehicle, said camera comprising:
a lens positioned to capture a view behind a vehicle, wherein the view includes a portion of the bumper of the vehicle;
an imager including an image sensor and an imager microcontroller, wherein the image sensor is positioned to receive images from the lens;
a camera microcontroller configured to control the application of an overlay to the images, wherein the camera microcontroller is operable to receive data from the imager microcontroller relating to bars of pixels on the image sensor, wherein the camera microcontroller is further operable to detect a reference point in the images using the data and is operable to determine an offset amount with which to shift the overlay on the images; and
wherein the camera microcontroller is operable to detect the vertical pixel position of the reference point using data from vertically stacked bars of pixels on the image sensor.

5. A camera as claimed in claim 4, wherein the camera microcontroller is operable to detect the horizontal pixel position of the reference point using data from horizontally stacked bars of pixels on the image sensor.

6. A camera as claimed in claim 4, wherein the reference point corresponds to a point on the edge of the bumper of the vehicle.

7. A camera as claimed in claim 6, wherein the edge of the bumper of the vehicle appears as a curved line in the images received by the imager and wherein the reference point is an extremum on the curved line.

8. A camera for a vehicle, said camera comprising:
a lens positioned to capture a view behind a vehicle, wherein the view includes a portion of the bumper of the vehicle;
an imager including an image sensor and an imager microcontroller, wherein the image sensor is positioned to receive images from the lens;
a camera microcontroller configured to control the application of an overlay to the images, wherein the camera microcontroller is operable to receive data from the imager microcontroller relating to bars of pixels on the image sensor, wherein the camera microcontroller is further operable to detect a reference point in the images using the data and is operable to determine an offset amount with which to shift the overlay on the images;
wherein, prior to detecting the reference point, the camera microcontroller determines whether there is sufficient contrast in the images; and
wherein the camera microcontroller selects bars of pixels in the images and compares brightness values of the pixels and variances in brightness between adjacent pixels within each bar to determine if there is sufficient contrast in the images.

9. A camera as claimed in claim 8, wherein the camera microcontroller is operable to determine the rotation angle of the camera and to adjust the offset amount based on the rotation angle.

10. A camera as claimed in claim 9, wherein the camera microcontroller is operable to determine the rotation angle of the camera and to adjust the position of the overlay rotationally based on the detected rotation angle.

11. A camera as claimed in claim 8, further comprising a near-infrared light emitting diode operable to emit near-infrared light on the portion of the bumper of the vehicle.

12. A camera for a vehicle, said camera comprising:
a lens positioned to capture a view behind a vehicle, wherein the view includes a portion of the bumper of the vehicle;
an imager including an image sensor and an imager microcontroller, wherein the image sensor is positioned to receive images from the lens;
a camera microcontroller configured to control the application of an overlay to the images, wherein the camera microcontroller is operable to receive data from the imager microcontroller relating to bars of pixels on the image sensor, wherein the camera microcontroller is further operable to detect a reference point in the images using the data and is operable to determine an offset amount with which to shift the overlay on the images;
wherein the imager microcontroller is operable to transmit the images to an in-vehicle display via an analog signal; and
wherein the camera microcontroller is operable to detect the reference point iteratively using data from the imager microcontroller relating to successively smaller bars of pixels on the image sensor.

13. A camera as claimed in claim 12, wherein the camera microcontroller is operable to detect the vertical pixel position of the reference point using data from vertically stacked bars of pixels on the image sensor, and wherein the camera microcontroller is operable to detect the horizontal pixel position of the reference point using data from horizontally stacked bars of pixels on the image sensor.

14. A camera as claimed in claim 12, wherein a near-infrared light emitting diode is operable to emit near-infrared light on the portion of the bumper of the vehicle.

15. A camera as claimed in claim 12, wherein, prior to detecting the reference point, the camera microcontroller determines whether there is sufficient contrast in the images, and wherein the camera microcontroller selects bars of pixels in the images and compares brightness values of the pixels and variances in brightness between adjacent pixels within each bar to determine if there is sufficient contrast in the images.

16. A camera as claimed in claim 12, wherein the camera microcontroller is operable to determine the rotation angle of the camera and to adjust the offset amount based on the rotation angle, and wherein the camera microcontroller is operable to determine the rotation angle of the camera and to adjust the position of the overlay rotationally based on the detected rotation angle.

* * * * *